United States Patent
Miyazaki

(10) Patent No.: US 11,362,745 B2
(45) Date of Patent: Jun. 14, 2022

(54) RADIO WAVE STATE ANALYSIS METHOD

(71) Applicant: YAMAHA CORPORATION, Hamamatsu (JP)

(72) Inventor: Hiroshi Miyazaki, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 109 days.

(21) Appl. No.: 16/440,066

(22) Filed: Jun. 13, 2019

(65) Prior Publication Data

US 2019/0296839 A1    Sep. 26, 2019

Related U.S. Application Data

(63) Continuation of application No. PCT/JP2017/044146, filed on Dec. 8, 2017.

(30) Foreign Application Priority Data

Dec. 28, 2016   (JP) .............................. JP2016-255450

(51) Int. Cl.
    *H04B 17/391*    (2015.01)
    *H04R 1/04*      (2006.01)
    *H04B 1/04*      (2006.01)
    *H04K 3/00*      (2006.01)

(52) U.S. Cl.
    CPC ............ *H04B 17/391* (2015.01); *H04B 1/04* (2013.01); *H04K 3/00* (2013.01); *H04K 3/22* (2013.01); *H04R 1/04* (2013.01); *H04K 3/226* (2013.01)

(58) Field of Classification Search
    None
    See application file for complete search history.

(56) References Cited

U.S. PATENT DOCUMENTS

| 6,987,949 B2 | 1/2006 | Taniguchi et al. |
| 8,670,380 B2 | 3/2014 | Green, III et al. |
| 2003/0157916 A1 | 8/2003 | Kamimura |

(Continued)

FOREIGN PATENT DOCUMENTS

| JP | H05183956 A | 7/1993 |
| JP | 2003143022 A | 5/2003 |

(Continued)

OTHER PUBLICATIONS

International Search Report issued in Intl. Appln. No. PCT/JP2017/044146 dated Feb. 27, 2018. English translation provided.

(Continued)

*Primary Examiner* — Mariela Vidal Carpio
(74) *Attorney, Agent, or Firm* — Rossi, Kimms & McDowell LLP

(57) ABSTRACT

A radio wave state analysis method acquires a radio wave for a place at which an audio system is sited, where the audio system includes one or more receiving devices for wireless reception of an audio signal; and generates relationship information indicative of a relationship between condition information and radio wave information indicative of the radio wave state, where the condition information includes at least one of time information indicative of a time when the radio wave state is measured or position information indicative of a position of the audio system.

5 Claims, 6 Drawing Sheets

(56) References Cited

U.S. PATENT DOCUMENTS

| | | | |
|---|---|---|---|
| 2007/0254596 A1* | 11/2007 | Corson | H04L 5/0016 |
| | | | 455/68 |
| 2009/0192790 A1* | 7/2009 | El-Maleh | G10L 21/02 |
| | | | 704/219 |
| 2009/0291644 A1* | 11/2009 | Suwa | H04B 1/005 |
| | | | 455/77 |
| 2011/0096934 A1 | 4/2011 | Babarskas et al. | |
| 2011/0250916 A1* | 10/2011 | Li | H04W 28/18 |
| | | | 455/509 |
| 2017/0019805 A1* | 1/2017 | Nakagawa | H04W 16/10 |
| 2017/0094604 A1* | 3/2017 | Yang | H04W 8/22 |
| 2017/0111068 A1* | 4/2017 | Shiotani | H04B 17/336 |
| 2019/0037504 A1* | 1/2019 | Shimura | H04W 72/0473 |
| 2019/0296839 A1* | 9/2019 | Miyazaki | H04B 1/0007 |

FOREIGN PATENT DOCUMENTS

| | | |
|---|---|---|
| JP | 2003244008 A | 8/2003 |
| JP | 2012095285 A | 5/2012 |
| JP | 2013509095 A | 3/2013 |
| JP | 2013524696 A | 6/2013 |
| WO | 2011049898 A1 | 4/2011 |
| WO | 2011127445 A2 | 10/2011 |

OTHER PUBLICATIONS

Written Opinion issued in Intl. Appln. No. PCT/JP2017/044146 dated Feb. 27, 2018.

Office Action issued in Japanese Appln. No. 2016-255450 dated Jun. 16, 2020. English machine translation provided.

* cited by examiner

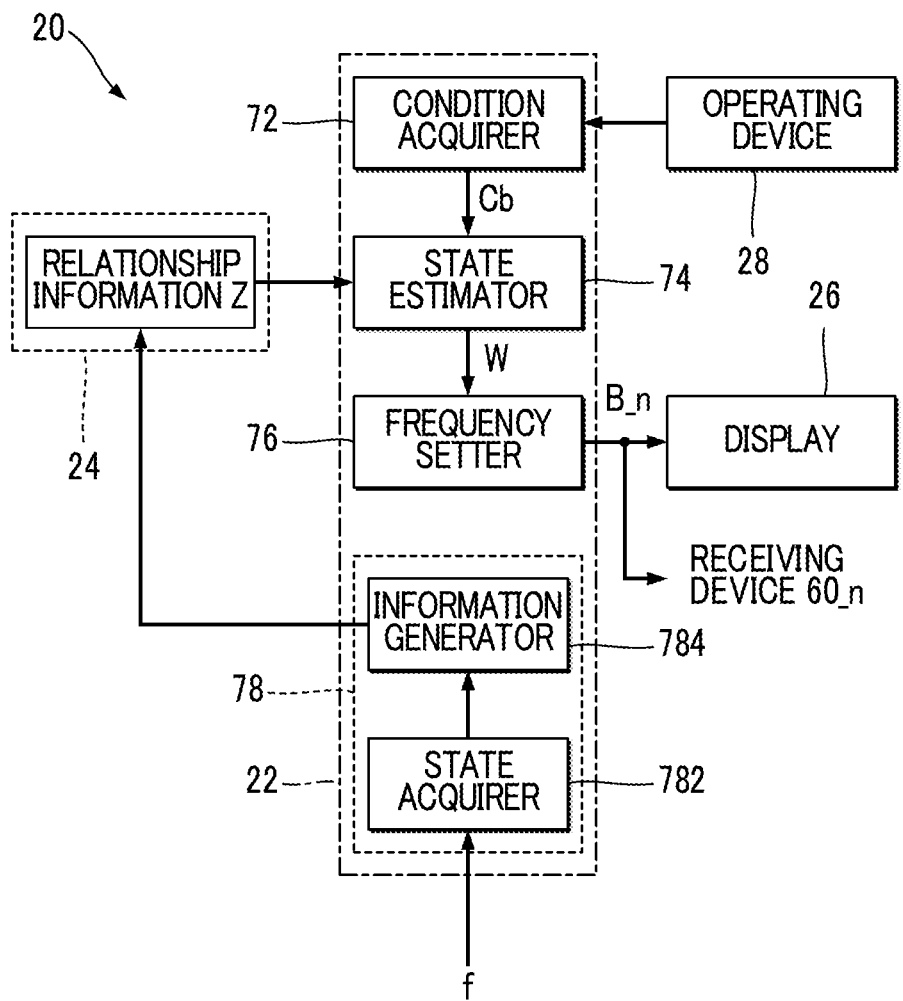

| Bc1 | Bc2 | Bc3 | Bc4 | Bc5 | ---- | W
|---|---|---|---|---|---|
| ○ | ○ | × | × | ○ | ---- |

○ : RADIO FIELD INTENSITY < α
× : RADIO FIELD INTENSITY > α

RADIO WAVE STATE ANALYSIS METHOD

CROSS REFERENCE TO RELATED APPLICATIONS

This application is a Continuation Application of PCT Application No. PCT/JP2017/044146, filed Dec. 8, 2017, and is based on and claims priority from Japanese Patent Application No. 2016-255450, filed Dec. 28, 2016, the entire content of which is incorporated herein by reference.

BACKGROUND

Technical Field

The present disclosure relates to a technology for analyzing a radio wave state for a place at which an audio system is sited.

Background Information

In an audio system in which plural receiving devices are provided (a wireless microphone system), each of the plural receiving devices wirelessly receives at least one audio signal from a corresponding sound receiving device, and thus it is important to appropriately set for each of the receiving devices a frequency band for radio waves. Japanese Patent Application Laid-Open Publication No. 2003-244008 (hereafter, JP 2003-244008) discloses a configuration in which a main device selected from among receiving devices communicates with other of the receiving devices, and non-overlapping frequency bands are set for each of the respective receiving devices.

Further, Japanese Translation of PCT International Application Publication No. JP-T-2013-509095 (hereafter, JP-T-2013-509095) discloses a configuration in which, when interference of radio waves in an audio system is detected, frequencies used by respective receiving devices are changed.

In the technology according to JP 2003-244008, radio wave interference among receiving devices constituting an audio system is suppressed. However, interference may nonetheless occur between radio waves used by an audio system and those used by an external device that is proximate to the audio system (for example, an electronic device that transmits and receives radio waves, or another audio system that includes receiving devices). Further, in the technology of JP-T-2013-509095, interference of radio waves in the audio system cannot be prevented in advance because a frequency of each receiving device is changed subsequent to actual detection of such interference.

SUMMARY

It is thus an object of the present disclosure to minimize a possibility of radio waves used in an audio system from interfering with radio waves of an external device.

To solve the above problem, in one aspect, a radio wave state analysis method according to the present disclosure includes: acquiring a radio wave state for a place at which an audio system is sited, where the audio system includes one or more receiving devices for wireless reception of an audio signal; and generating relationship information indicative of a relationship between condition information and radio wave information indicative of the radio wave state, where the condition information includes at least one of time information indicative of a time when the radio wave state is measured or position information indicative of a position of the audio system.

In another aspect, a radio wave state analysis method according to the present disclosure includes: generating condition information that includes at least one of time information indicative of a time when an audio system is used or position information indicative of a position of the audio system, where the audio system includes one or more receiving devices for wireless reception of an audio signal; and identifying radio wave information in accordance with the generated condition information, by use of relationship information indicative of a relationship between radio wave information indicative of a radio wave state and condition information.

BRIEF DESCRIPTION OF THE DRAWINGS

FIG. 6 is a block diagram of an information processing apparatus.
FIG. 7 is a schematic diagram of relationship information.

DESCRIPTION OF THE EMBODIMENTS

First Embodiment

Figure 1:
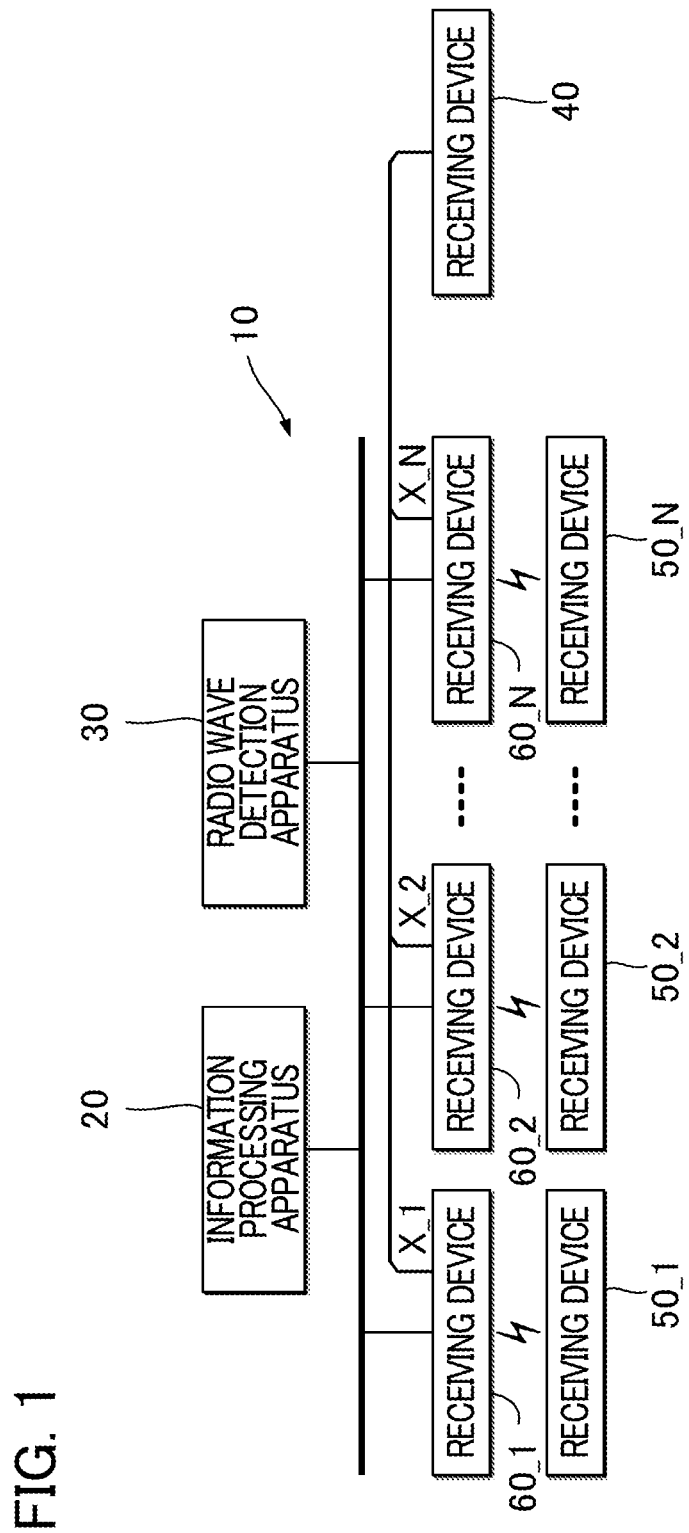
FIG. 1 is a block diagram of an audio system according to a first embodiment of the present disclosure.

FIG. 1 is a block diagram of an audio system 10 according to a first embodiment of the present disclosure. As illustrated in FIG. 1, the audio system 10 according to the first embodiment is a wireless microphone system that includes an information processing apparatus 20, a radio wave detection apparatus 30, a playback device 40, a plurality of (N) sound receiving devices 50_1 to 50_N, and a plurality of (N) receiving devices 60_1 to 60_N. The audio system 10 is sited in an event space such as a hall where a variety of events such as concerts or lectures are held. The audio system 10 of the first embodiment is movable. That is, the audio system 10 is used where the audio system 10 is sited at a freely-selected place, and is moved to another place after use. The radio wave detection apparatus 30 and the N receiving devices 60_1 to 60_N can communicate with the information processing apparatus 20 via a communication network such as a local area network (LAN), for example. Further, the N sound receiving devices 50_1 to 50_N and the N receiving devices 60_1 to 60_N correspond to each other on a one-to-one basis.

Figure 2:
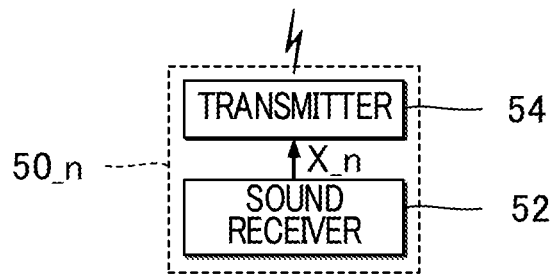
FIG. 2 is a block diagram of a sound receiving device.
Figure 3:
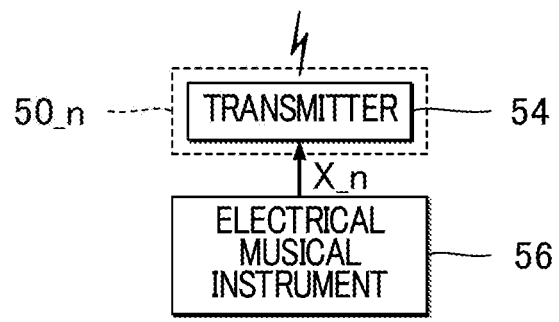
FIG. 3 is another block diagram of the sound receiving device.

Any one sound receiving devices 50_$n$ ($n$=1 to N) is a portable wireless microphone that wirelessly transmits an audio signal X_n representative of a waveform of a variety of sounds such as those of speech or music. Specifically, as illustrated in FIG. 2, the sound receiving device 50_$n$ used includes a sound receiver 52 that generates the audio signal X_n by receiving sound, and a transmitter 54 that wirelessly transmits the audio signal X_n generated by the sound receiver 52. A specific form of the sound receiving device 50_$n$ can be freely selected. For example, the sound receiving device 50 can be of a body-pack type in which the sound receiver 52 and the transmitter 54 comprise separate bodies and are connected to each other by wire or wirelessly, or the sound receiving device 50 can be a hand-held type in which the sound receiver 52 and the transmitter 54 are accommodated in a single-body casing. As illustrated in FIG. 3, the sound receiving device 50_$n$ can be one that includes the transmitter 54 that wirelessly transmits an audio signal X_n generated by an electric musical instrument 56 such as an electric stringed instrument. A frequency band (hereafter, a "use band") B_n of radio waves to be used for transmission of the audio signal X_n by each sound receiving device 50_$n$ is changed, for example, according to an instruction made by a user.

Figure 4:
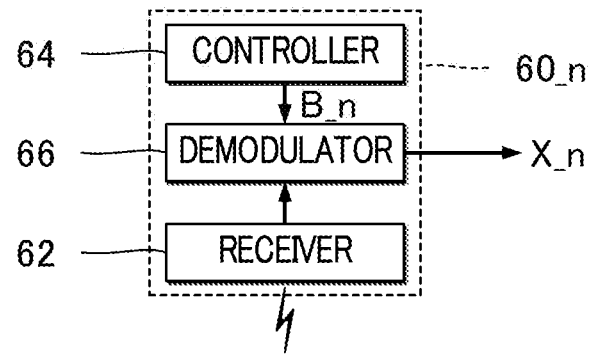
FIG. 4 is a block diagram of a receiving device.

Each receiving device 60_$n$ in FIG. 1 may receive an audio signal X_n transmitted by the sound receiving device 50_$n$ corresponding to the receiving device 60_$n$. FIG. 4 is a block diagram of any one receiving device 60_$n$. As illustrated in FIG. 4, the receiving device 60_$n$ includes a receiver 62, a controller 64, and a demodulator 66. The receiver 62 includes, for example, an antenna that receives surrounding radio waves, and the receiver 62 generates a reception signal representative of a radio field intensity. The controller 64 indicates a use band B_n to the demodulator 66. The controller 64 of the receiving device 60_$n$ indicates to the demodulator 66 a use band B_n that is the same as the one that is used by the sound receiving device 50_$n$ corresponding to the receiving device 60_$n$. The demodulator 66 extracts and demodulates signal components in the use band B_n indicated by the controller 64 from the reception signal generated by the receiver 62, thereby to generate the audio signal X_n. The audio signal X_n generated by the demodulator 66 of each receiving device 60_$n$ is supplied to the playback device 40.

Figure 5:
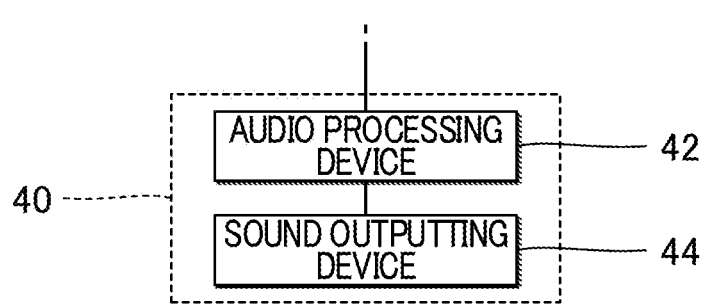
FIG. 5 is a block diagram of a playback device.

The playback device 40 plays back a sound according to N-channel audio signals X_1 to X_N supplied from the different receiving devices 60_$n$. As illustrated in FIG. 5, the playback device 40 includes an audio processing device 42 and a sound outputting device 44. The audio processing device 42 is a mixer that adds the N-channel audio signals X_1 to X_N. In some embodiments, the audio processing device 42 may adjust volume or frequency characteristics of each audio signal X_n, or may apply various audio effects to each audio signal X_n. The sound outputting device 44 outputs sound waves depending on the audio signal processed by the audio processing device 42.

The information processing apparatus 20 sets each of the N use bands B_1 to B_N. Specifically, the information processing apparatus 20 sets the N use bands B_1 to B_N so that the use bands B_1 to B_N do not overlap (more specifically, so that radio waves in the use bands B_n do not interfere with each other). FIG. 6 is a block diagram of the information processing apparatus 20. As illustrated in FIG. 6, the information processing apparatus 20 of the first embodiment is realized by a computer system including a control device 22, a storage device 24, a display 26, and an operating device 28. For example, an information device such as a personal computer is used as the information processing apparatus 20.

The control device 22 is, for example, a processing circuit including a central processing unit (CPU), and integrally controls the entire information processing apparatus 20. The storage device 24 is formed of, for example, a known recording medium such as a magnetic recording medium or a semiconductor recording medium, and stores a program to be executed by the control device 22 and a variety of data for use by the control device 22. It is of note that the storage device 24 can be realized by recording media of the same type or of different types.

The display 26 (for example, a liquid crystal display panel) displays a variety of images under control of the control device 22. The operating device 28 is an input device that receives an instruction from a user, and includes, for example, operators that are operated by the user. For example, operators that can be operated by the user or a touch panel that detects a touch on a display surface of the display 26 can be used as the operating device 28.

Radio waves radiated from an external device other than the audio system 10 (hereafter, "jamming radio waves") may exist in a place at which the audio system 10 is sited. For example, jamming radio waves radiated by an electronic device used around the audio system 10 or an external device such as another audio system are likely to reach the vicinity of each sound receiving device 50_$n$ or each receiving device 60_$n$. The information processing apparatus 20 sets N use bands B_1 to B_N so that a frequency band of jamming radio waves estimated at a time and place at which the audio system 10 is used is avoided. Relationship information Z stored in the storage device 24 is used for setting the use band B_n. The relationship information Z is information representative of a tendency of prior occurrence of jamming radio waves.

A state of the jamming radio waves affecting the audio system 10 (hereafter, an "radio wave state") may differ depending on a time and place at which the audio system 10 is used. On the other hand, considering an actual tendency that an external device is highly likely to be used regularly at a specific place, it can be assumed that a radio wave state at a specific time and specific place will tend to approximate a radio wave state at that place at the same time in the past. That is, the radio wave states at the specific place are likely to approximate each other if a time zone is the same, even if dates are different. For example, assuming a case in which an event such as a concert is regularly held in a time zone of 18:00 to 19:00 on Saturdays around the place where the audio system 10 is sited, the same jamming radio waves are highly likely to be measured in the time zone even when dates are different. In consideration of the above circumstances, the relationship information Z is information representative of a radio wave state predicted for a specific time and place from measurement results of radio wave states in the past.

FIG. 7 is a schematic diagram of the relationship information Z. As illustrated in FIG. 7, the relationship information Z is a data table in which a plurality of pieces of condition information Ca (Ca1, Ca2, . . . ) are each associated with a corresponding piece of radio wave information W (W1, W2, . . . ). The radio wave information W is information representative of a radio wave state. In the first embodiment, the radio wave information W represents frequency characteristics of the jamming radio waves as a radio wave state. The frequency characteristics are expressed in the form of, for example, a frequency spectrum (for example, an amplitude spectrum or a power spectrum).

In the relationship information Z, condition information Ca that corresponds to any piece of radio wave information W is information indicative of conditions under which the radio wave state indicated by the radio wave information W was measured. As illustrated in FIG. 7, the condition information Ca of the first embodiment includes time information Ta (Ta1, Ta2, . . . ) and position information La (La1, La2, . . . ). The time information Ta is information indicative of a time (specifically, a time zone) in which the radio wave state represented by the radio wave information W was measured. For example, one time zone on a specific day of the week (for example, 18:00 to 19:00 on Saturdays) is designated by the time information Ta. Further, the specific day, date, or month may be designated by the time information Ta. The position information La is information indicative of a position at which the radio wave state represented by the radio wave information W was measured. For example, information such as a longitude and latitude, a residential address, or a facility name each are examples of the position information La. A country name, a prefecture name, a specific range divided within a map, or the like may be designated by the position information La. The radio wave information W is generated using the prior results of measurement of the jamming radio waves at a specific place and a specific time. As will be understood from the above description, a radio wave state indicated by radio wave information W corresponding to condition information Ca shows a radio wave state of jamming radio waves that is highly likely to be measured under temporal and positional conditions indicated by the corresponding condition information Ca.

As illustrated in FIG. 6, the control device 22 of the information processing apparatus 20 executes the program stored in the storage device 24 to realize elements (a condition acquirer 72, a state estimator 74, a frequency setter 76, and an analysis processor 78) for setting the N use bands B_1 to B_N. The functions of the control device 22 can be distributed across a plurality of devices. Alternatively, a dedicated electronic circuitry may be used to realize some of the functions of the control device 22.

The condition acquirer 72 acquires condition information Cb indicative of a use condition of the audio system 10. The condition information Cb includes time information Tb indicative of a time in which the audio system 10 is used and position information Lb indicative of a place at which the audio system 10 is used. In the first embodiment, the user indicates, to the information processing apparatus 20, instruction of the time and position at which the audio system 10 is actually used by operating the operating device 28. The condition acquirer 72 generates the condition information Cb including time information Tb indicative of a time instructed by the user and position information Lb indicative of a position instructed by the user. It is of note that a method of generating the condition information Cb is not limited to the above example. For example, the time information Tb indicative of a current time clocked by a clock device may be generated or position information La indicative of a position detected by a position detection function using, for example, the Global Positioning System (GPS) may be generated.

The state estimator 74 identifies radio wave information W in accordance with the condition information Cb acquired by the condition acquirer 72, by use of the relationship information Z stored in the storage device 24. Specifically, the state estimator 74 searches the relationship information Z for condition information Ca that includes time information Ta that matches or approximates the time information Tb of the condition information Cb and position information La that matches or approximates the position information Lb of the condition information Cb, thereby to identify the radio wave information W corresponding to the condition information Ca. That is, the state estimator 74 identifies the radio wave information W representative of the radio wave state of the jamming radio waves that is likely to be present at a time and place at which the audio system 10 is actually used. As will be understood from the above description, the state estimator 74 functions as an element that estimates the radio wave state of the jamming radio waves where the audio system 10 is actually used.

Figure 8:
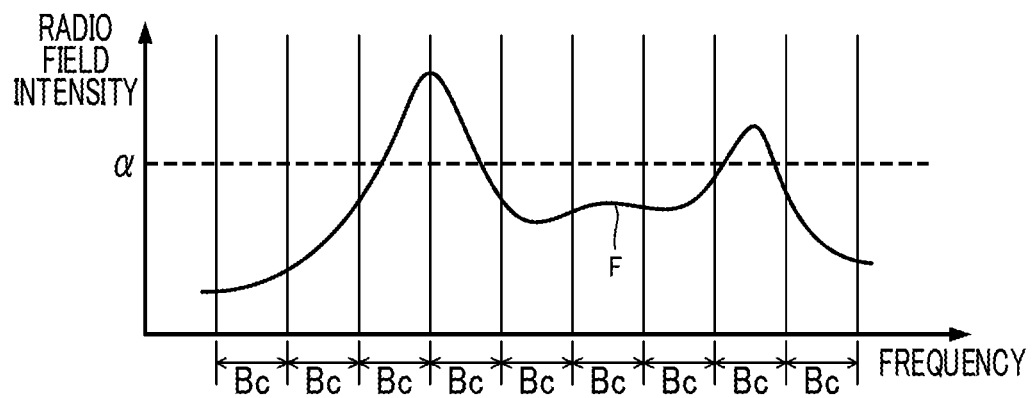
FIG. 8 is an illustrative diagram of a process of setting a use band.

The frequency setter 76 sets the N use bands B_1 to B_N by using the radio wave information W identified by the state estimator 74. FIG. 8 is an illustrative diagram of a process of setting each use band B_n by the frequency setter 76. Frequency characteristics (a frequency spectrum) F indicated by the radio wave information W identified by the state estimator 74 are illustrated in FIG. 8.

As illustrated in FIG. 8, a frequency band that can be used by the audio system 10 is divided into bands (hereafter, "candidate bands") Bc in units of predetermined bandwidths. The frequency setter 76 selects the N use bands B_1 to B_N from candidate bands Bc, for each of which a radio field intensity falls below a predetermined threshold value a in a frequency characteristic F indicated by the radio wave information W identified by the state estimator 74. In a candidate band Bc that includes a frequency in which jamming radio waves from an external device are highly likely to be present, the radio field intensity in the frequency characteristic F exceeds a threshold value a. Therefore, the N use bands B_1 to B_N are set, exclusive of the candidate band Bc in which jamming radio waves are highly likely to be present under an actual use situation of the audio system 10.

The frequency setter 76 in FIG. 6 indicates each use band B_n set in the process illustrated above for the receiving device 60_n. The controller 64 of the receiving device 60_n indicates, to the demodulator 66, the use band B_n indicated by the information processing apparatus 20. Further, the frequency setter 76 displays the N use bands B_1 to B_N on the display 26 to present the N use bands B_1 to B_N to the user. The user indicates instruction of each of the use bands B_n displayed on the display 26 for each sound receiving device 50_n. The transmitter 54 of the sound receiving device 50_n transmits the audio signal X_n to the receiving device 60_n by use of radio waves in the use band B_n. As will be understood from the above description, the use bands B_n (B_1 to B_N) of each receiving device 60_n and each sound receiving device 50_n are set so as to avoid the candidate band Bc in which jamming radio waves are highly likely to be present under the actual use situation of the audio system 10.

Figure 9:
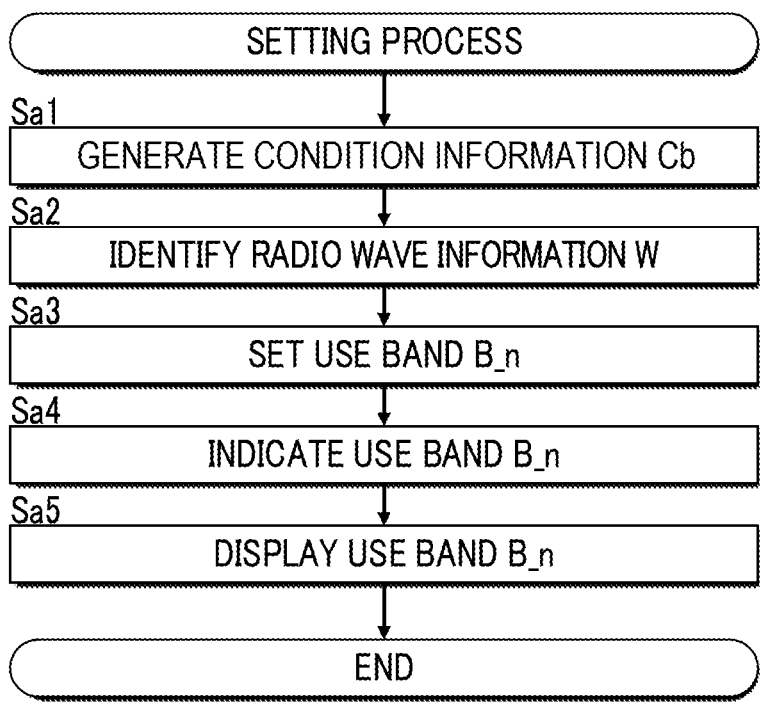
FIG. 9 is a flowchart of a setting process.

FIG. 9 is a flowchart of a process of setting the N use bands B_1 to B_N (hereafter, a "setting process"). The process is performed by the information processing apparatus 20. For example, when the user instructs start of the operation of the audio system 10 by operating the operating device 28, a setting process of FIG. 9 is started.

When start of the operation of the audio system 10 is instructed, the user operates the operating device 28, as appropriate, to indicate a time and place at which the audio system 10 is used. The condition acquirer 72 generates condition information Cb that includes time information Tb indicative of the time indicated by the user and position information Lb indicative of the place indicated by the user (Sa1). The state estimator 74 identifies radio wave information W in accordance with the condition information Cb (Sa2). Specifically, the state estimator 74 searches, from the relationship information Z, for condition information Ca that includes time information Ta that matches or approximates the time information Tb of the condition information Cb and position information La that matches or approximates the position information Lb, to identify radio wave information W corresponding to the condition information Ca (Sa2). The frequency setter 76 sets the N use bands B_1 to B_N by using the radio wave information W identified by the state estimator 74 (Sa3). The frequency setter 76 indicates each use band B_n to each receiving device 60_n (Sa4), and causes the display 26 to display each use band B_n (Sa5). It is of note that an order of the indication (Sa4) and the display (Sa5) of each use band B_n may be reversed.

As will be understood from the above description, in the first embodiment, the radio wave information W corresponding to the condition information Cb indicative of an actual use situation of the audio system 10 is identified by using the relationship information Z indicative of relationships between pieces of radio wave information W each indicative of a radio wave state and a corresponding piece of different condition information Ca. That is, the radio wave state assumed under the actual use situation of the audio system 10 is estimated. Therefore, an advantage is obtained in that, by referring to the radio wave state indicated by the radio wave information W, it is possible to minimize a possibility of interference between radio waves used by the audio system 10 and jamming radio waves of an external device. Additionally, an advantage is obtained in that it is possible to prevent interference due to the jamming radio waves before such interference occurs, as compared with the configuration of the technique disclosed in JP-T-2013-509095, in which the frequency of each receiving device is changed subsequent to detection of interference of radio waves. In the first embodiment, in particular, since the use band B_n of each sound receiving device 50_n and each receiving device 60_n is set according to the radio wave information W, an advantage is obtained in that it is possible to effectively minimize a possibility of interference between the radio waves used by the audio system 10 and the jamming radio waves of an external device.

As described above, the prior measurement results of the jamming radio waves are reflected in the relationship information Z. The radio wave detection apparatus 30 of FIG. 1 is a measurement apparatus that detects a radio wave state for generation of the relationship information Z. The detection of the radio wave state by the radio wave detection apparatus 30 is executed where the respective sound receiving devices 50_n and the respective receiving devices 60_n are not in communication. That is, the radio wave detection apparatus 30 measures the radio wave state of the jamming radio waves present at the place where the audio system 10 is sited.

Figure 10:
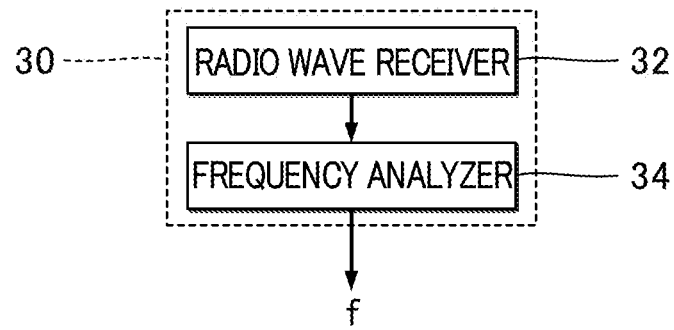
FIG. 10 is a block diagram of a radio wave detection apparatus.

FIG. 10 is a block diagram of the radio wave detection apparatus 30. As illustrated in FIG. 10, the radio wave detection apparatus 30 includes a radio wave receiver 32 and a frequency analyzer 34. The radio wave receiver 32 includes, for example, an antenna that receives surrounding radio waves, and generates a measurement signal representative of a radio field intensity. The frequency analyzer 34 of FIG. 10 generates frequency characteristics f of the radio waves received by the radio wave receiver 32 as a radio wave state. Specifically, the frequency analyzer 34 is a spectrum analyzer that calculates a frequency characteristic f by executing frequency analysis such as a fast Fourier transform on the measurement signal. The information processing apparatus 20 is notified of the frequency characteristic f generated by the radio wave detection apparatus 30 (the frequency analyzer 34) together with a time when the frequency characteristic f was measured (hereafter, a "measurement time"). The generation of the frequency characteristics f by the radio wave detection apparatus 30 is repeatedly executed multiple times.

As illustrated in FIG. 6, the control device 22 of the information processing apparatus 20 functions as the analysis processor 78. The analysis processor 78 generates or updates the relationship information Z using the radio wave states (frequency characteristics f) sequentially measured by the radio wave detection apparatus 30. As illustrated in FIG. 6, the analysis processor 78 includes a state acquirer 782 and an information generator 784.

Figure 11:
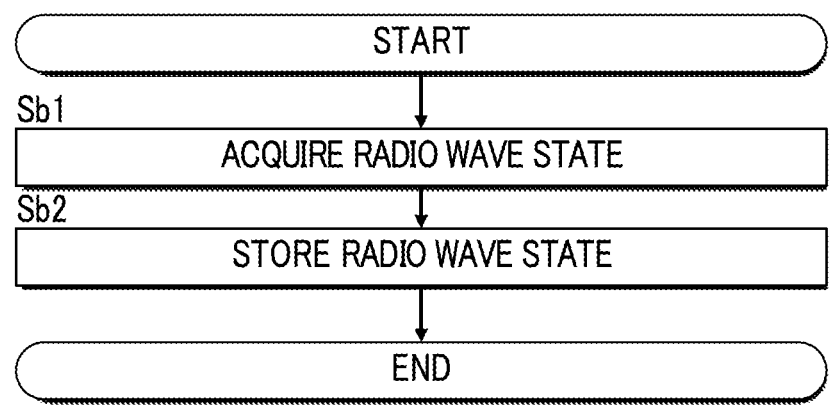
FIG. 11 is a flowchart of a process in which a state acquirer acquires a radio wave state.

The state acquirer 782 acquires a radio wave state (frequency characteristic f) measured by the radio wave detection apparatus 30. Specifically, as illustrated in FIG. 11, the state acquirer 782 acquires the frequency characteristic f and the measurement time from the radio wave detection apparatus 30 (Sb1), and stores the frequency characteristic f and the measurement time in the storage device 24 (Sb2). The above process is executed each time the radio wave detection apparatus 30 measures a new frequency characteristic f. That is, the process shown in FIG. 11 of acquiring the radio wave state (a step of acquiring the radio wave state) is executed at multiple points on a time axis, and a plurality of frequency characteristics f corresponding to different measurement times are stored in the storage device 24. It is of note that, in a configuration in which the information processing apparatus 20 is notified of a frequency characteristic f immediately after measurement by the radio wave detection apparatus 30, a time when the state acquirer 782 receives the frequency characteristic f from the radio wave detection apparatus 30 may be stored as the measurement time in the storage device 24, together with the frequency characteristic f.

The information generator 784 in FIG. 6 generates the relationship information Z by using the radio wave states acquired in the above procedure by the state acquirer 782. Specifically, the information generator 784 generates relationship information Z representative of relationships between pieces of radio wave information W in accordance with the radio wave states acquired by the information acquirer and a corresponding piece of condition information Ca indicative of a condition under which each radio wave state was measured.

Figure 12:
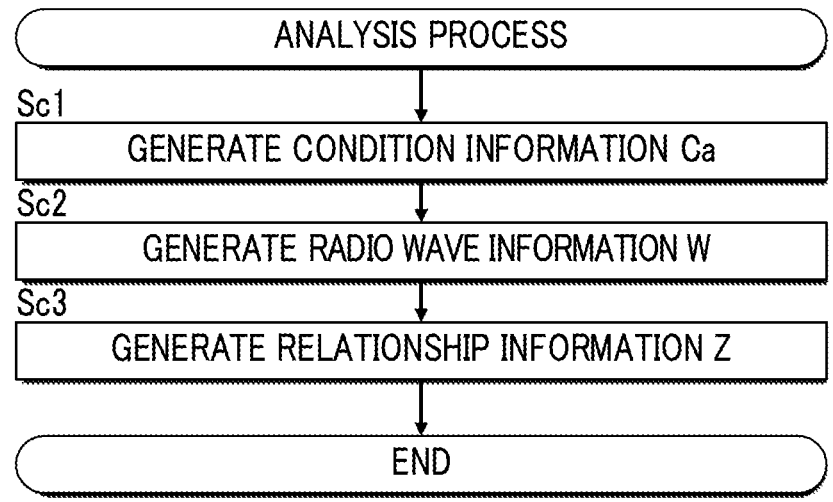
FIG. 12 is a flowchart of an analysis process.

FIG. 12 is a flowchart of a process of generating the relationship information Z (hereafter, an "analysis process") performed by the information generator 784. The analysis process is started in response to an instruction from the user made to the operating device 28, for example.

When the analysis process is started, the information generator 784 generates condition information Ca including time information Ta and position information La (Sc1). Specifically, the information generator 784 generates the time information Ta indicative of a time zone in which the frequency characteristic f was measured. For example, the time information Ta can be generated from the measurement time acquired in step Sb1 of FIG. 11. Further, the information generator 784 acquires the position information La indicative of a place where the audio system 10 is sited. In the first embodiment, position information La indicative of a position indicated by the user by an operation made to the operating device 28 (that is, a measurement position of the radio wave state) is generated. It is of note that, for example, in a configuration in which the position detection function using the Global Positioning System (GPS) is mounted in the information processing apparatus 20, position information La indicative of a position detected by the position detection function may be generated.

The information generator 784 generates radio wave information W from a plurality of frequency characteristics f stored in the storage device 24 (Sc2). The information generator 784 generates the radio wave information W from the plurality of frequency characteristics f, each of which corresponds to a measurement time that falls within the time zone indicated by the time information Ta. Specifically, the information generator 784 generates the radio wave information W indicative of a frequency characteristic F that reflects the plurality of frequency characteristics f. The frequency characteristic F is, for example, an average of the plurality of the frequency characteristics f.

The information generator 784 generates relationship information Z indicative of correspondence between the condition information Ca generated in step Sc1 and the radio wave information W generated in step Sc2 (Sc3). That is, a relationship between the radio wave information W indicative of a representative radio wave state in the past and the condition information Ca indicative of measurement conditions (time and position) of the radio wave state is defined by the relationship information Z.

As described above, in the first embodiment, relationship information Z indicative of relationships between pieces of radio wave information W each indicative of a radio wave state of a place where the audio system 10 is sited and a corresponding piece of condition information Ca indicative of a time and place at which the radio wave state was measured is generated. Therefore, it is possible to estimate a radio wave state that is assumed in the actual use situation of the audio system 10. In the first embodiment, in particular, since radio wave states (specifically, the frequency characteristics f) at different points in time are reflected in the radio wave information W, an advantage is obtained in that a radio wave state assumed in a use situation of the audio system 10 can be estimated with high accuracy.

Second Embodiment

A second embodiment of the present disclosure will now be described. In each configuration illustrated below, respective components having the same actions and functions as those in the first embodiment are denoted by the same reference signs used in the description of the first embodiment, and detailed description thereof will be omitted as appropriate.

Figures 13, 14:
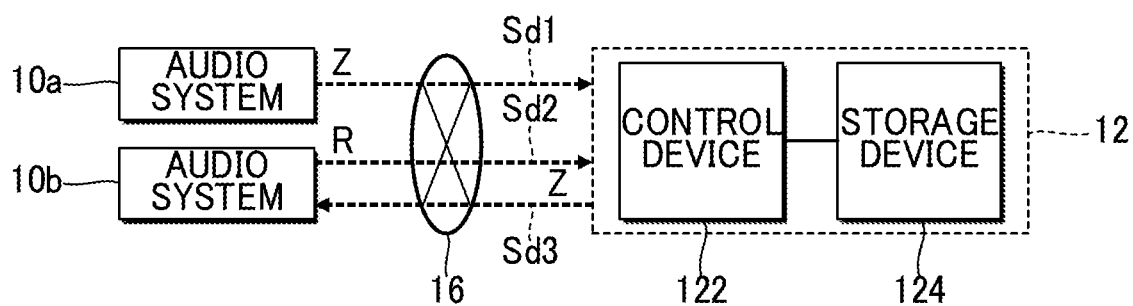
FIG. 13 is a block diagram of a communication system according to a second embodiment.
FIG. 14 is a schematic diagram of radio wave information in a modification.

FIG. 13 is a block diagram of a communication system in the second embodiment. As illustrated in FIG. 13, the communication system of the second embodiment includes audio systems 10 (10*a* and 10*b*) and a management apparatus 12. The information processing apparatus 20 of each of the audio systems 10 can communicate with the management apparatus 12 via a communication network 16 such as the Internet. It is of note that, although a large number of audio systems 10 are included in the communication system in actuality, freely-selected two audio systems 10*a* and 10*b* only are illustrated for convenience in FIG. 13. The audio system 10*a* and the audio system 10*b* may be used at discrete places proximate to each other. For example, a case is assumed that the audio system 10*a* and the audio system 10*b* are sited at different levels within the same facility. The audio system 10*a* and the audio system 10*b* have the same configuration as that of the audio system 10 of the first embodiment.

The management apparatus 12 is a server (for example, a web server) that manages an operation of each of the audio systems 10, and is realized by a computer system including a control device 122 and a storage device 124. The control device 122 is, for example, a processing circuit including a CPU, and integrally controls the entire management apparatus 12. The storage device 124 is configured as, for example, a known recording medium such as a magnetic recording medium or a semiconductor recording medium, and stores a program to be executed by the control device 122 and a variety of pieces of data for use by the control device 122. The storage device 124 may be realized by multiple recording media of the same type or of different types.

The information processing apparatus 20 of the audio system 10*a* transmits relationship information Z generated by the analysis processor 78 to the management apparatus 12 (Sd1). For example, the relationship information Z is transmitted in response to an instruction from the user made to the operating device 28. The control device 122 of the management apparatus 12 stores the relationship information Z received from the audio system 10*a* in the storage device 124. A plurality of pieces of relationship information Z transmitted in series from a plurality of audio systems 10 are stored in the storage device 124.

Meanwhile, the information processing apparatus 20 of the audio system 10*b* transmits a request R for the relationship information Z (hereafter, an "information request") to the management apparatus 12 (Sd2). For example, the information request R is transmitted in response to an instruction from the user made to the operating device 28. Upon receiving the information request R, the control device 122 of the management apparatus 12 acquires the relationship information Z from the storage device 124, and transmits the relationship information Z to the audio system 10*b*, which is the request source (Sd3). The information processing apparatus 20 of the audio system 10*b* stores the relationship information Z received from the management apparatus 12 in the storage device 24. The information processing apparatus 20 of the audio system 10*b* executes the setting process of FIG. 9 using the relationship information Z received from the management apparatus 12, to set N use bands B_1 to B_N, each use band B_n to be used by each sound receiving device 50_*n* and each receiving device 60_*n* of the audio system 10*b*. The details of the setting process are the same as those in the first embodiment. As will understood from the above description, the relationship information Z generated by the information processing apparatus 20 of the specific audio system 10 is shared and used by another audio system 10.

As described above, the audio system 10*a* and the audio system 10*b* are sited at different places. Therefore, the state estimator 74 of the audio system 10*b* identifies the radio wave information W using the relationship information Z generated for a place different from the place of the audio system 10*b* (specifically, a place where the audio system 10*a* is sited). However, radio wave states of the jamming radio waves also approximate each other where the audio system 10*a* and the audio system 10*b* are proximate to each other. Therefore, even when in actuality the relationship information Z generated from the result of measuring the jamming radio waves at a place where the audio system 10*a* is used in the audio system 10*b*, which is located at a different place, the N use bands B_1 to B_N can be set in such a way to avoid a frequency band of the jamming radio waves being present at the place of the audio system 10*b*. As described above, in the second embodiment, since the relationship information Z generated by the audio system 10*a* is provided to the audio system 10*b* via the management apparatus 12, the audio system 10*b* need not measure the jamming radio waves. That is, an advantage is obtained in that the radio wave detection apparatus 30 can be omitted from the audio system 10*b*.

In a configuration in which the audio system 10*b* includes a radio wave detection apparatus 30, the information processing apparatus 20 of the audio system 10*b* may transmit the relationship information Z to the management apparatus 12. The relationship information Z transmitted from the audio system 10*b* is transmitted from the management apparatus 12 to the audio system 10*a* in response to, for example, an information request R from the audio system 10*a*. The relationship information Z may be exchanged between the audio system 10*a* and the audio system 10*b*.

However, according to the configuration of the first embodiment in which the audio system 10*a* uses relationship information Z generated by using results measured at a place where the audio system 10*a* is sited, an advantage is obtained in that the radio wave state of jamming radio waves present at the place can be estimated with high accuracy.

Modifications

Each mode illustrated above is variously modified. Specific modifications are illustrated below. Two or more modes freely selected from the following may be combined as appropriate in so far as such combination does not result in any contradiction.

(1) In each of the above-described embodiments, an example is given of radio wave information W representative of the frequency characteristic F. However, the content of the radio wave information W is not limited to the above example. For example, the radio wave information W used may be indicative of whether or not the radio field intensity exceeds a threshold value a for each of the candidate bands Bc (Bc1, Bc2, . . . ) (that is, whether or not the candidate bands are available as the use band B_n), as illustrated in FIG. 14. The radio wave information W of FIG. 14 has an advantage in that the amount of data is smaller than that of the radio wave information W in the first embodiment indicative of the frequency characteristics F.

(2) In each of the above-described embodiments, there is shown a configuration in which the radio wave detection apparatus 30 is provided in a separate body from the information processing apparatus 20 and the receiving device 60_*n*. However, the function of the radio wave detection apparatus 30 may be mounted in the information processing apparatus 20 or in one of the receiving devices 60_*n*. Further, in each of the above-described embodiments, there is shown a configuration in which the information processing apparatus 20 is separate from the receiving device 60_*n*, the function of the information processing apparatus 20 may be mounted in one of the receiving devices 60_*n*. As will be understood from the above description, in the present disclosure, the information processing apparatus 20 or the radio wave detection apparatus 30 can be provided as a discrete single-body device or as a device that is integral with the receiving device 60_*n*.

(3) In each of the above-described embodiments, an example of the relationship information Z is given in the form of a data table in which radio wave information W is associated with each of a corresponding different condition information Ca. However, a format of the relationship information Z is not limited to the above example. For example, a statistical model representative of a relationship between the condition information Ca and the radio wave information W may be generated as the relationship information Z. The statistical model represented by the relationship information Z is, for example, a mathematical model that generates radio wave information W with a maximum likelihood with respect to given condition information Cb indicative of the actual use situation of the audio system 10 under a tendency measured in a correlation between the condition information Ca and the radio wave information W. Such a mathematical model is generated by machine learning using voluminous sets of condition information Ca and radio wave information W as learning data. Specifically, information defining a variety of pattern recognition models such as a support vector machine (SVM) or a neural network (NN) can be used as the relationship information Z.

(4) In each of the above-described embodiments, all the frequency characteristics f generated by the radio wave detection apparatus 30 are reflected in the radio wave information W. In some embodiments, the radio wave information W may be generated using the frequency characteristics f generated for some of the points in time at which the radio wave detection apparatus 30 measures the jamming radio waves. For example, the state acquirer 782 acquires the frequency characteristics f from the radio wave detection apparatus 30 for each of K (K is a natural number equal to or greater than 2) points in time. The information generator 784 generates the radio wave information W from the frequency characteristics f acquired by the state acquirer 782 for some of the K points in time (for example, points in time periodically extracted from the K points in time).

(5) In each of the embodiments described above, the condition information Ca includes the time information Ta and the position information La; however, either one of the time information Ta or the position information La may be omitted from the condition information Ca. For the condition information Cb, either one of the time information Ta or the position information La may be similarly omitted.

(6) Each of the above-described embodiments illustrates a configuration in which the information processing apparatus 20 indicates the use band B_n to each receiving device 60_*n*. However, a user upon viewing each use band B_n on the display 26 may manually indicate an instruction and set the use band B_n for the apparatus 60_*n*. Further, each of the above-described embodiments illustrates a configuration in which the user manually sets the use band B_n of the sound receiving device 50_*n*. However, the information processing apparatus 20 may indicate instruction of the use band B_n to each sound receiving device 50_*n*. For example, the use band B_n is wirelessly instructed from the information processing apparatus 20 to the sound receiving device 50_*n* via the receiving device 60_*n*.

(7) As illustrated in each of the above-described embodiments, the information processing apparatus 20 is realized by the control device 22 and the program working in coordination with each other.

A program according to a first aspect of the present disclosure causes a computer to execute a process of acquiring a radio wave state of a place at which an audio system including one or more receiving devices that wirelessly receive an audio signal is sited; and a process of generating relationship information indicative of a relationship between condition information and radio wave information indicative of the radio wave state, where the condition information includes at least one of time information indicative of a time when the radio wave state is measured or position information indicative of a position of the audio system.

Further, a program according to a second aspect of the present disclosure causes a computer to execute a process of generating condition information including at least one of time information indicative of a time in which an audio system including one or more receiving devices that wirelessly receive an audio signal is used or position information indicative of a position of the audio system, and a process of identifying radio wave information indicative of a radio wave state in accordance with the generated condition information, by use of relationship information indicative of a relationship between radio wave information and condition information.

The program of each aspect illustrated above is a program able to be stored in a computer-readable recording medium in the computer. The recording medium is, for example, a non-transitory recording medium, and is preferably an optical recording medium (optical disc) such as a CD-ROM. However, the recording medium may be provided in any known media such as a semiconductor recording medium or a magnetic recording medium. It is of note that the non-transitory recording medium includes freely-selected recording medium other than a transitory propagation signal, and a volatile recording medium may also be used. Further, the program may be distributed to the computer by way of any known network.

(8) The following aspects are derivable from above embodiments and modifications, for example.

A radio wave state analysis method according to an aspect (aspect 1) of the present disclosure includes acquiring a radio wave state for a place at which an audio system is sited, where the audio system includes one or more receiving devices for wireless reception of an audio signal; and generating relationship information indicative of a relationship between condition information and radio wave information indicative of the radio wave state, where the condition information includes at least one of time information indicative of a time when the radio wave state is measured or position information indicative of a position of the audio system.

In the above aspect, relationship information indicative of a relationship between radio wave information indicative of a radio wave state at the place at which the audio system is sited and condition information indicative of a time and position at which the radio wave state was measured is generated. Therefore, it is possible to estimate a radio wave state assumed in the actual use situation of the audio system.

In an example (aspect 2) of aspect 1, acquiring the radio wave state includes acquiring radio wave states at a plurality of points that differ in time, and generating the relationship information includes generating the relationship information indicative of a relationship between the radio wave information indicative of the radio wave states acquired for the plurality of points in time and the condition information.

In the above aspect, since the radio wave states at plural points in time are reflected in the radio wave information, an advantage is obtained in that the radio wave state assumed in the use situation of the audio system can be estimated with high accuracy.

In an example (aspect 3) of aspect 2, generating the relationship information includes generating the relationship information indicative of a relationship between the radio wave information indicative of some of the radio wave states acquired for some of the plurality of points in time and the condition information.

A radio wave state analysis method according to an aspect (aspect 4) of the present disclosure includes generating condition information that includes at least one of time information indicative of a time when an audio system is used or position information indicative of a position of the audio system, where the audio system includes one or more receiving devices for wireless reception of an audio signal; and identifying radio wave information indicative of a radio wave state in accordance with the generated condition information, by use of relationship information indicative of a relationship between radio wave information and condition information.

In the above configuration, the radio wave information corresponding to the actual use situation of the audio system is identified by using the relationship information indicative of the relationship between the radio wave information indicative of the radio wave state and the condition information indicative of the use condition of the audio system. An advantage is obtained in that it is possible to minimize a possibility of interference between radio waves to be used by the audio system and jamming radio waves of an external device by referring to the radio wave state indicated by the radio wave information.

In an example (aspect 5) of aspect 4, the method further includes setting a frequency to be used by each of the one or more receiving devices of the audio system, by using the identified radio wave information.

According to the above aspect, since the frequency to be used by the receiving device is set according to the radio wave information, an advantage is obtained in that it is possible to minimize a possibility of interference between the radio waves used by the audio system and jamming radio waves of an external device.

In an example (aspect 6) of aspect 5, identifying the radio wave information includes identifying the radio wave information by using the relationship information generated for a place at which the audio system is sited.

In the above aspect, the relationship information generated for the place at which the audio system is sited is used for identification of the radio wave information. Therefore, an advantage is obtained in that the radio wave state of jamming radio waves at the place of the audio system can be estimated with high accuracy.

In an example (aspect 7) of aspect 4 or aspect 5, identifying the radio wave information includes identifying the radio wave information, by using the relationship information generated for another place (for example, a place within a specific range such as 500 m or less from the audio system, a facility adjacent to a facility at which the audio system is sited, or the like) proximate to a place at which the audio system is sited.

In the above aspect, the relationship information generated for the other place proximate to the place at which the audio system is sited is used for identification of the radio wave information. Therefore, an advantage is obtained in that the audio system need not detect the electric field state of the jamming radio waves.

In an example (aspect 8) of any one of aspects 1 to 7, the radio wave information represents frequency characteristics. Further, in the example (aspect 9) according to any one of aspects 1 to 7, the radio wave information is information indicative of, for each frequency band, whether or not a radio field intensity exceeds a threshold value. In the above aspect, an advantage is obtained in that the amount of data of the radio wave information can be easily reduced.

DESCRIPTION OF REFERENCE SIGNS

10(10a, 10b) Audio system
12 Management apparatus
122 Control device
124 Storage device
16 Communication network
20 Information processing apparatus
22 Control device 24 Storage device
26 Display
28 Operating device
30 Radio wave detection apparatus
32 Radio wave receiver
34 Frequency analyzer
40 Playback device
42 Audio processing device
44 Sound outputting device
50_$n$ (50_1 to 50_N) Sound receiving device
52 Sound receiver
54 Transmitter
56 Electric musical instrument
60_$n$ (60_1 to 60_N) Receiving device
62 Receiver
64 Controller
66 Demodulator
72 Condition acquirer
74 State estimator
76 Frequency setter
78 Analysis processor
782 State acquirer
784 Information generator

What is claimed is:

1. A computer-implemented analysis method of a radio wave state, comprising:

generating use condition information that includes time information indicative of a time when an audio system is used and position information indicative of a position of the audio system at the time when the audio system is used, where the audio system includes a plurality of sound receiving devices for reception of sound and wireless transmission of an audio signal corresponding to the received sound, and a plurality of audio signal receiving devices for wireless reception of the audio signal transmitted from the plurality of sound receiving devices;

identifying radio wave information indicative of the radio wave state of jamming radio waves in accordance with the generated use condition information, by use of relationship information indicative of a relationship between measured radio wave information indicative of a measured radio wave state including, for each frequency band, whether a radio field intensity exceeds a threshold value and measurement condition information indicative of a measurement condition of the measured radio wave state; and setting a frequency to be used by each of the plurality of sound receiving devices of the audio system, by using the identified radio wave information.

2. The radio wave state analysis method according to claim 1,
wherein identifying the radio wave information includes identifying the radio wave information by using the relationship information generated for a place at which the audio system is sited.

3. The radio wave state analysis method according to claim 1,
wherein identifying the radio wave information includes identifying the radio wave information, by using the relationship information generated for another place within a predetermined distance to a place at which the audio system is sited.

4. The radio wave state analysis method according to claim 1,
wherein the measured radio wave information represents frequency characteristics.

5. The radio wave state analysis method according to claim 1, wherein the plurality of sound receiving devices are wireless microphones.

* * * * *